United States Patent [19]

Ziemacki

[11] 4,217,538

[45] Aug. 12, 1980

[54] REGULATED PERMANENT MAGNET D.C. POWER SUPPLY

[75] Inventor: Michael S. Ziemacki, Winter Haven, Fla.

[73] Assignee: Wolff Controls Corporation, Winter Haven, Fla.

[21] Appl. No.: 944,720

[22] Filed: Sep. 22, 1978

[51] Int. Cl.² .............................................. H02P 9/10
[52] U.S. Cl. ...................................... 322/29; 307/16; 322/90
[58] Field of Search ...................... 322/29, 90, 17, 28; 307/16

[56] References Cited

U.S. PATENT DOCUMENTS

| | | | |
|---|---|---|---|
| 3,017,563 | 1/1962 | Renner et al. | 322/90 |
| 3,160,772 | 12/1964 | Miron | 322/90 X |
| 3,694,731 | 9/1972 | Cherry | 322/29 X |
| 4,045,718 | 8/1977 | Gray | 322/90 X |
| 4,163,187 | 7/1979 | Thomas | 322/29 |

Primary Examiner—Robert J. Hickey

Attorney, Agent, or Firm—Duckworth, Hobby, Allen & Pettis

[57] ABSTRACT

The power supply of the present invention comprises a power takeoff shaft driven by mechanical electrical or other means and a magnetic field of the permanent magnet together with a first winding for generating a first output voltage proportional to the shaft RPM. A second winding is coupled to the shaft and positioned within the magnetic field of the permanent magnet for generating a second output voltage proportional to the shaft RPM. The first and second windings are designed so that the first output voltage will exceed and be directly proportional to the second output voltage. A control circuit is coupled to the first and second windings to selectively connect the first and second windings to produce an output voltage as close as possible to a predetermined value as the RPM of the driving shaft varies. Voltage regulator circuitry is coupled to the output of the control circuit to regulate the output voltage therefrom.

34 Claims, 5 Drawing Figures

REGULATED PERMANENT MAGNET D.C. POWER SUPPLY

BACKGROUND OF THE INVENTION

1. Field of the Invention

The present invention relates to permanent magnet generators, and in particular to a multiple winding permanent magnet generator including switching circuitry for selectively coupling the windings of the generator to provide the desired output voltage.

2. Description of the Prior Art

It is well known that the output voltage from a permanent magnet generator is directly proportional to the RPM of the generator drive shaft. Constant output voltages from permanent magnet generators are typically obtained by either closely regulating the RPM of the generator shaft or by providing a specially designed electronic voltage regulator which is capable of operating over wide RPM ranges. This latter type of voltage regulating device is not only expensive but also highly inefficient.

Remotely located diesel driven pumps or electrical generating apparatus are frequently utilized to provide an emergency or stand-by backup feature. These diesel engines are designed to be activated only when needed and rarely have access to a source of electrical power for maintaining a battery in a charged state.

The more modern diesel engines used in these applications incorporate an electronically controlled fuel injection system which must have a voltage source of a predetermined minimum magnitude in order to permit normal operation of the engine. These infrequently operated diesel engines are started by high pressure air starting systems which are capable of rotating the engine at rates of over 100 RPM. It is therefore a requirement that a mechanically rotatable power source be provided for powering at a sufficient level, the diesel engine electronic fuel injection system at an engine RPM of less than the maximum obtainable RPM from the diesel engine pneumatic starting system.

U.S. Pat. No. 3,396,325 (Hopkinson) discloses a permanent magnet generator the output voltage of which is controlled by a special control winding which requires a low power external power supply for proper operation. U.S. Pat. No. 3,401,290 (Potter) discloses a permanent magnet electric generator having an axially movable stator for adjusting the output voltage thereof. U.S. Pat. No. 3,443,135 (Lombard) discloses a permanent magnet variable voltage alternator having a two part, movable permanent magnet rotor. U.S. Pat. No. 3,360,667 (Gordon) discloses a generator having mechanically movable field magnets for changing the output voltage thereof. U.S. Pat. No. 3,713,015 (Frister) discloses an alternating current generator having a two part permanent magnet rotor which is adjustable in response to the output voltage thereof. U.S. Pat. No. 3,214,675 (Foster) discloses a permanent magnet generator having a supplemental rotary flux coil to regulate the output voltage thereof. U.S. Pat. No. 4,015,189 (Gordon) discloses a supplemental field excitation apparatus for the permanent magnet rotor of a pilot exciter to control the load regulation of a generator field winding.

U.S. Pat. No. 2,648,044 (Opel) discloses a voltage regulated generator having a control winding which utilizes the saturation region of operation to effect voltage regulation. U.S. Pat. No. 3,160,772 (Miron) discloses a plural voltage alternator having dual alternating current windings in a single field electromagnet. U.S. Pat. No. 3,551,784 (Shaw) discloses an alternating current generator having plural output windings for generating alternating current outputs which are electrically isolated from one another.

The following U.S. Pat. Nos. are also of interest: 3,237,034 (Krasnow) and 3,242,365 (Kaober).

SUMMARY OF THE INVENTION

The present invention contemplates a regulated D.C. power supply comprising a variable RPM drive means and means for generating a magnetic field. First winding means is coupled to said drive means and positioned within the magnetic field for generating a first output voltage proportional to the RPM of said drive means. Second winding means is coupled to said drive means and positioned within the magnetic field for generating a second output voltage proportional to the RPM of said drive means. The first output voltage is greater than and generally directly proportional to the second output voltage. Control means is coupled to said first and second winding means for selectively connecting said first and said second winding means to produce an output voltage as close as possible to a predetermined value as the RPM of said drive means changes. Regulator means may also be provided following said control means to regulate the output voltage from said control means to a level as close as possible to a desired output voltage.

DESCRIPTION OF THE DRAWING

The invention is pointed out with particularity in the appended claims. However, other objects and advantages together with the operation of the invention, may be better understood by reference to the following detailed description taken in connection with the following illustrations wherein:

DESCRIPTION OF THE PREFERRED EMBODIMENT

In order to better illustrate the advantages of the invention and its contributions to the art, a preferred hardware embodiment of the invention will now be described in some detail.

Figure 1:
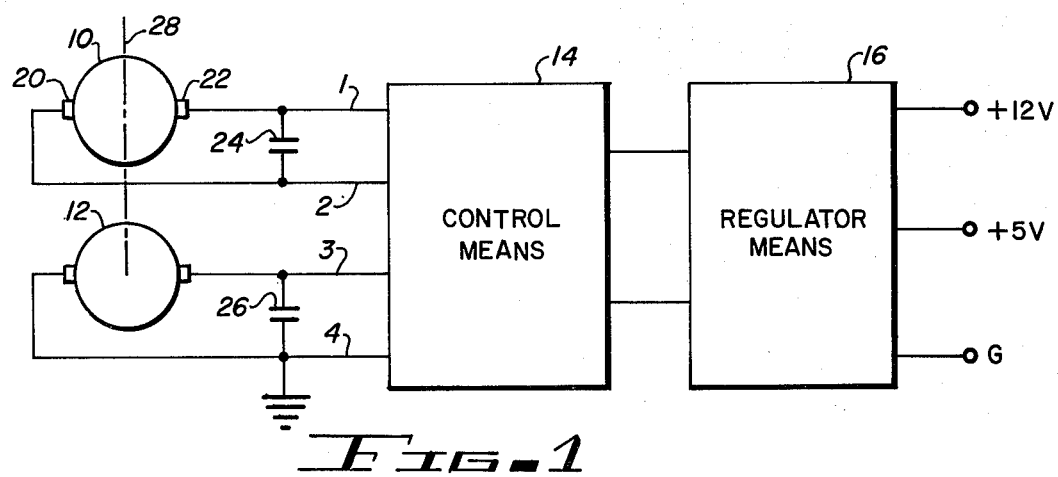
FIG. 1 is a block diagram of a D.C. power supply of the present invention.
Figure 2:
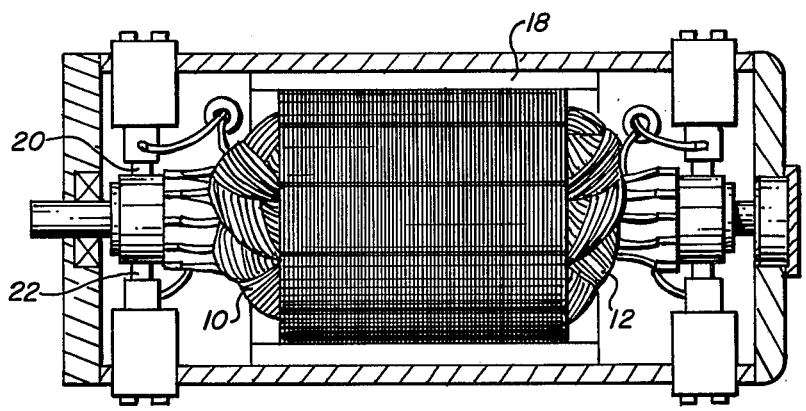
FIG. 2 illustrates the permanent magnet and first and second winding means of the present invention.

Referring now to FIGS. 1 and 2, the D.C. power supply of the present invention includes first winding means 10, second winding means 12, control means 14 and regulator means 16. Winding means 10 is fabricated with a greater number of turns of wire than is the case with winding means 12. Thus for all RPM conditions the first winding means will generate a higher output voltage than will the second winding means. A permanent magnet 18 creates a magnetic field which penetrates the area in which the first and second winding means rotate.

The output voltage from winding means 10 is coupled to a pair of output conductors 1 and 2 by a pair of carbon brushes 20 and 22 in a conventional manner. In a similar manner the output voltage from second winding means 12 is coupled to output conductors 3 and 4. Low value filter capacitors 24 and 26 are coupled across output conductors 1 and 2 and 3 and 4 to attenuate brush noise.

A single shaft 28 is coupled to the crank shaft or a power takeoff shaft of an internal combustion engine or to some other type of variable RPM drive means. Shaft 28 is coupled to the iron core on which first and second winding means are wound and thus causes both winding means to rotate at the same RPM.

Figure 3:
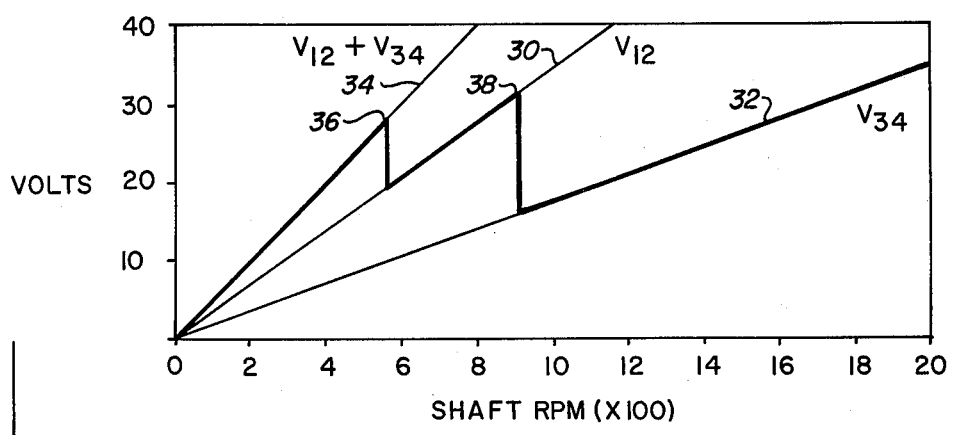
FIG. 3 is a graph illustrating the output voltage of the D.C. power supply of the present invention as a function of engine operating RPM.

Referring now to FIG. 3, a graph of the output voltages from winding means 10 and 12 with respect to the RPM shaft 28 will now be discussed. The symbol $V_{12}$ is used to designate the output voltage across lines 1 and 2 from first winding means 10 and while the symbol $V_{34}$ designates the output voltage from second winding means 12. As can be seen from FIG. 3, the line designated by reference number 30 indicates a plot of the output voltage $V_{12}$ with respect to RPM. Reference number 32 indicates a plot of voltage $V_{34}$ with respect to RPM, while reference number 34 indicates a plot of the sum of $V_{12}$ plus $V_{34}$ with respect to RPM.

In the preferred embodiment of the present invention it is desired to maintain the peak input voltage to regulator means 16 at a level not to exceed approximately 30 volts. As the drive means which is coupled to shaft 28 begins to rotate from a 0 RPM level, windings 10 and 12 are connected in a series aiding configuration by control means 14 in order to produce the maximum obtainable output voltage equal to the output voltage across conductors 1 and 2 plus the output voltage across conductors 3 and 4. Reference number 34 indicates the slope of this output voltage with respect to RPM. If electronic circuitry such an electronically controlled governor for a diesel engine requires a minimum operating voltage of 12 volts, it can be seen that an RPM of approximately 200 will enable the present invention to produce this required operating voltage. As the RPM increases to approximately 500, the output voltage from control means 14 will approach 30 volts. Since 30 volts is the desired maximum input voltage to regulator means 16, the electrical circuitry within control means 14 will actuate switching means within control means 14 at the voltage indicated by reference number 36 to disconnect second winding means 12 and to couple only output voltage $V_{12}$ to the input of regulator means 16.

Once again, as the shaft RPM increases the output voltage $V_{12}$ from control means 14 will increase until it reaches the maximum desired output voltage at a point indicated by reference number 38. At this point, control means 14 will once again actuate its switching means to disconnect winding means 10 and connect winding means 12 in order to produce a voltage equal to $V_{34}$ at the output of control means 14. As the RPM of shaft 28 continues to increase output voltage $V_{34}$ will slowly continue increasing, but at a relatively low rate.

Figure 4:
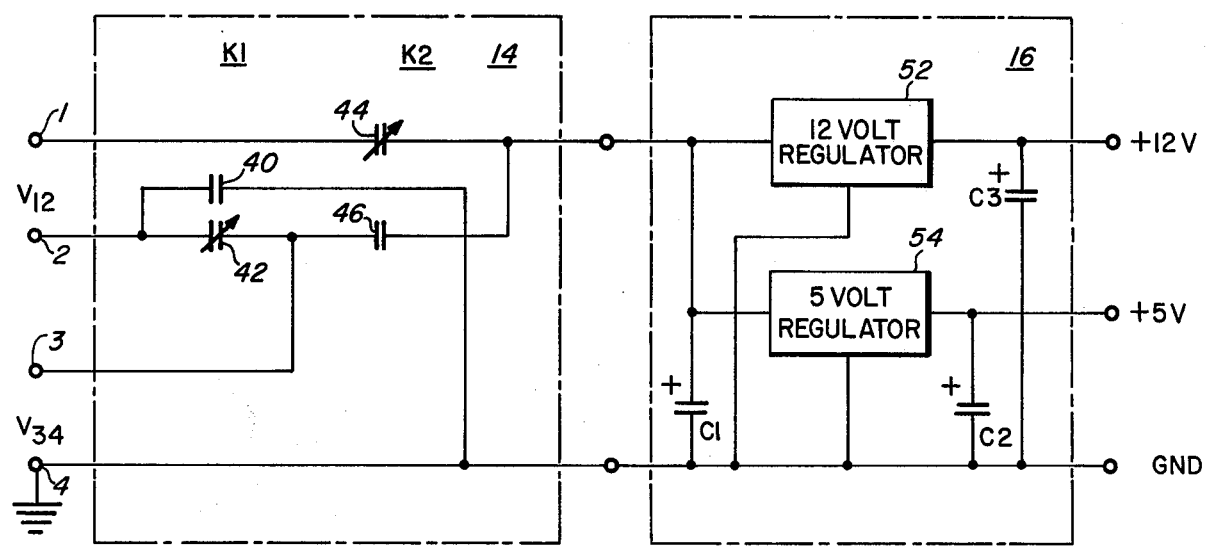
FIG. 4 is a partial schematic diagram of the control means and regulator means illustrated in FIG. 1.

Referring now to FIG. 4, the operation of the switching means within control means 14 will now be discussed. The electronic control for switching means illustrated in FIG. 4 will be discussed below in connection with FIG. 5.

The switching means of the present invention includes a pair of relays K1 and K2. Relay K1 includes a pair of normally open contacts 40 and a pair of normally closed contacts 42. Relay K2 includes a pair of normally closed contacts 44 and a pair of normally open contacts 46.

Figure 5:
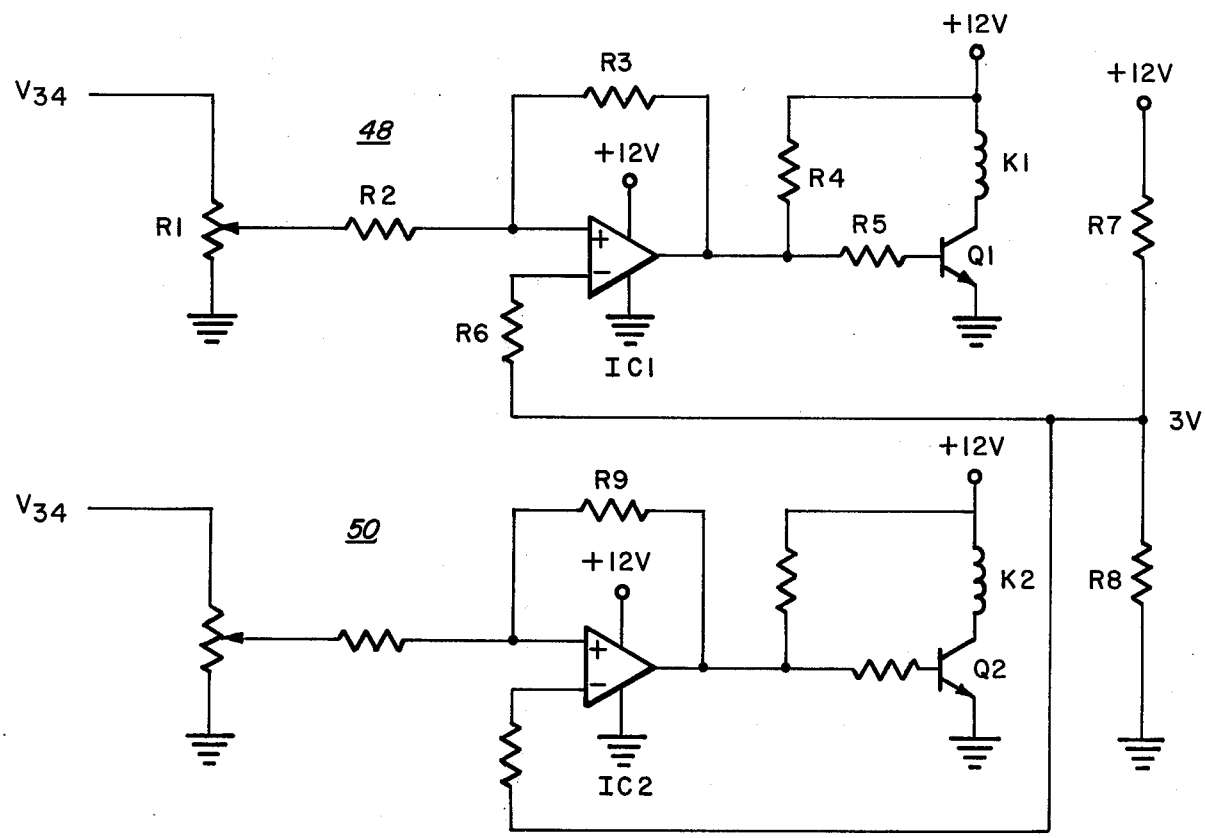
FIG. 5 is an electrical schematic diagram of the remaining portion of the control means illustrated in FIG. 4.

Referring now to FIGS. 4 and 5, the switching means which controls relay K1 and K2 includes voltage comparator circuits 48 and 50. The input of each voltage comparator circuit may be coupled to the output of either winding means and in the preferred embodiment is coupled to the output of winding means 12. The structure and operation of voltage comparators 48 and 50 is identical and for the purposes of explanation, the operation of only one of these will be discussed.

Resistor R2 is coupled between the input of a voltage comparator integrated circuit IC1, such as the LM399 manufactured by National Semiconductor, and potentiometer R1. The setting of the tap on potentiometer R1 is adjusted so that with IC1 will trigger at the shaft RPM indicated by reference number 36 in FIG. 3. Similarly, the tap on potentiometer R1 in voltage comparator circuit 50 is set so that comparator IC2 will trigger at the shaft RPM indicated by reference number 38 in FIG. 3.

When voltage comparator IC1 triggers and generates an output pulse, transistor Q1 is turned on causing current to flow through the coil of relay K1. Actuation of relay K1 causes the contacts of the relay to reverse positions. A reference voltage for voltage comparators IC1 and IC2 is provided by a voltage divider network consisting of resistors R7 and R8. The following table indicates the values of the resistors used in voltage comparison circuits 48 and 50:

TABLE I

| COMPONENT | COMPONENT VALUE |
|---|---|
| R1 | 50 Kohm |
| R2 | 50 Kohm |
| R3 | 510 Kohm |
| R4 | 10 Kohm |
| R5 | 10 Kohm |
| R6 | 50 Kohm |
| R7 | 30 Kohm |
| R8 | 10 Kohm |
| R9 | 1 Mohm |

As a result of the operation of voltage comparators 48 and 50 in the switching means, the relay contacts will be in the positions shown in FIG. 4 when the RPM of shaft 28 is at a point to the left of reference number 36 in FIG. 3. For RPM ranges between the point indicated by reference number 36 and reference number 38, relay K1 will close causing relay contacts 40 to close and relay contacts 42 to open. Thus for shaft RPMs greater than those indicated by reference number 36 but less than those indicated by reference number 38, winding means 10 will be coupled directly to the input of regulator means 16.

As the shaft RPM further increases to the point indicated by reference number 38, voltage comparison circuit 50 will be actuated causing relay contacts 44 to open and relay contacts 46 to close. In this configuration, winding means 12 will be directly coupled to the input of regulator means 16.

Resistors R3 and R9 are provided in a feedback path for integrated circuits IC1 and IC2 to incorporate a hysteresis effect to prevent operating instability during switching.

Referring to FIG. 4, regulator 16 includes inexpensive and efficient series regulators 52 and 54. In the preferred embodiment, a 12 volt regulator such as the National Semiconductor LM340-12 and a 5 volt regulator such as the National Semiconductor LM340-5 are utilized. These regulators function very effectively as a result of the comparatively small input voltage swing.

High value electrolytic filter capacitors C1, C2 and C3 are provided to improve the effectiveness and regulation of regulator means 16.

It will be apparent to those skilled in the art that the disclosed D.C. power supply may be modified in numerous ways and may assume many embodiments other than the preferred form specifically set out and described above. For example, a more sophisticated control means could be provided which would enable windings 10 and 12 to be switched into a series opposing relationship to permit operation at even higher Shaft RPMs without exceeding a predetermined maximum output voltage to the regulator means. Furthermore, numerous other winding means could be provided together with more sophisticated control means to effectuate substantially more sophisticated control over the output voltage of the power supply. Accordingly, it is intended by the appended claims to cover all such modifications of the invention which fall within the true spirit and scope of the invention.

I claim:

1. A regulated D.C. power supply comprising
   a. a variable RPM drive means;
   b. means for generating a magnetic field;
   c. first winding means coupled to said drive means and positioned within the magnetic field for generating a first output voltage proportional to the RPM of said drive means;
   d. second winding means coupled to said drive means and positioned within the magnetic field for generating a second output voltage proportional to the RPM of said drive means, the first output voltage being greater than the second output voltage;
   e. control means coupled to said first and second winding means for selectively connecting said first and said second winding means to produce an output voltage as close as possible to a predetermined value as the RPM of said drive means changes; and
   f. regulator means coupled to said control means for regulating the output voltage from said control means to a level as close as possible to a desired output voltage.

2. The regulator power supply of claim 1 wherein said first winding means and said second winding means are wound on a single core.

3. The regulator power supply of claim 2 wherein said core is an iron core.

4. The regulator power supply of claim 3 wherein said magnetic field generating means includes an electromagnet.

5. The regulator power supply of claim 3 wherein said magnetic field generating means includes a permanent magnet.

6. The regulated power supply of claim 5 wherein said control means initially connects said first winding means and said second winding means in series aiding relationship to produce the maximum possible output voltage as said drive means commences rotation.

7. The regulated power supply of claim 6 wherein said control means uses only the output from said second winding means when said drive means is rotating at its maximum RPM.

8. The regulated power supply of claim 7 wherein said control means includes comparator means coupled to the input of said control means for comparing the input voltage of said control means with predetermined voltage levels.

9. The regulated power supply of claim 8 wherein said control means includes switch means coupled to said comparator means for selectively connecting said first and second winding means to produce an output voltage as close as possible to a predetermined value as the RPM of said drive means changes.

10. The regulated power supply of claim 9 wherein said switch means includes electromagnetic relays.

11. The regulated power supply of claim 9 wherein said switch means includes solid state electronic switches.

12. The regulated power supply of claim 3 wherein said drive means includes an internal combustion engine.

13. The regulated power supply of claim 3 wherein said drive means includes an electrically driven power source.

14. The regulated power supply of claim 13 wherein said electrically driven power source includes an electric motor.

15. The regulated power supply of claim 13 wherein said electrically driven power source includes a fluid driven motor.

16. A D.C. power supply for an air started diesel engine having an electronically controlled fuel injection system for providing an output voltage of a sufficient magnitude to permit normal operation of the diesel engine fuel injection system at an RPM lower than the starting RPM of the air start system, said power supply comprising:
   a. a power takeoff shaft driven by said diesel engine;
   b. a permanent magnet;
   c. first winding means coupled to said shaft and positioned within the magnetic field of said permanent magnet for generating a first output voltage proportional to the RPM of said engine;
   d. second winding means coupled to said shaft and positioned within the magnetic field of said permanent magnet for generating a second output voltage proportional to the RPM of said engine, the first output voltage being greater than the second output voltage; and
   e. control means coupled to said first and second winding means for selectively connecting said first and second winding means to produce an output voltage as close as possible to a predetermined value as the RPM of said engine changes.

17. The power supply of claim 16 further including regulator means coupled to said control means for regulating the output voltage from said control means.

18. The power supply of claim 16 wherein said first winding means and said second winding means are wound on a single core.

19. The power supply of claim 18 wherein said core is an iron core.

20. A regulated D.C. power supply for supplying power to an apparatus including variable RPM drive means, said power supply comprising:

a. means coupled to said drive means for generating first and second output voltages varying directly with the RPM of said drive means, said first output voltage being greater than the second output voltage; and b. control means coupled to said generating means for selectively combining said first and second output voltages to produce an output voltage approaching a predetermined value as the RPM of said drive means changes.

21. The power supply of claim 20 including a voltage regulator coupled to said control means for regulating the output voltage from said control means to a level approaching a desired output voltage.

22. The power supply of claim 20 wherein said control means includes voltage comparison means coupled to said generating means for generating an output voltage when said first output voltage reaches a predetermined level.

23. The power supply of claim 22 wherein said control means further includes switch means coupled to the output of said voltage comparison means for selectively combining said first and second output voltages in response to the output from said voltage comparison means.

24. The power supply of claim 23 wherein said switch means includes an electromechanical relay.

25. The power supply of claim 23 wherein said switch means includes a solid state switching device.

26. The power supply of claim 22 wherein the input of said voltage comparison means is coupled to measure the magnitude of said voltage.

27. The power supply of claim 22 wherein the input of said voltage comparison means is coupled to measure the magnitude of said second voltage.

28. The power supply of claim 21 wherein said voltage regulator includes a first voltage regulator circuit for generating a first regulated output voltage and a second voltage regulator circuit for generating a second regulated output voltage.

29. The power supply of claim 20 wherein said generating means includes:

a. means for generating a magnetic field;

b. first winding means coupled to said drive means and positioned within the magnetic field for generating said first output voltage; and c. second winding means coupled to said drive means and positioned within the magnetic field for generating said second output voltage.

30. The power supply of claim 29 wherein said first and second winding means are wound on a single core.

31. The power supply of claim 24 further including a second relay.

32. The power supply of claim 31 wherein said first and second relays include a first set of normally open contacts and a second set of normally closed contacts.

33. The power supply of claim 29 wherein said magnetic field generating means includes a permanent magnet.

34. The power supply of claim 29 wherein said magnetic field generating means includes an electromagnet.

* * * * *